June 10, 1958  R. B. COTTON  2,838,259
AIRCRAFT BRIDLE ARRESTER
Filed Oct. 12, 1955  2 Sheets-Sheet 1
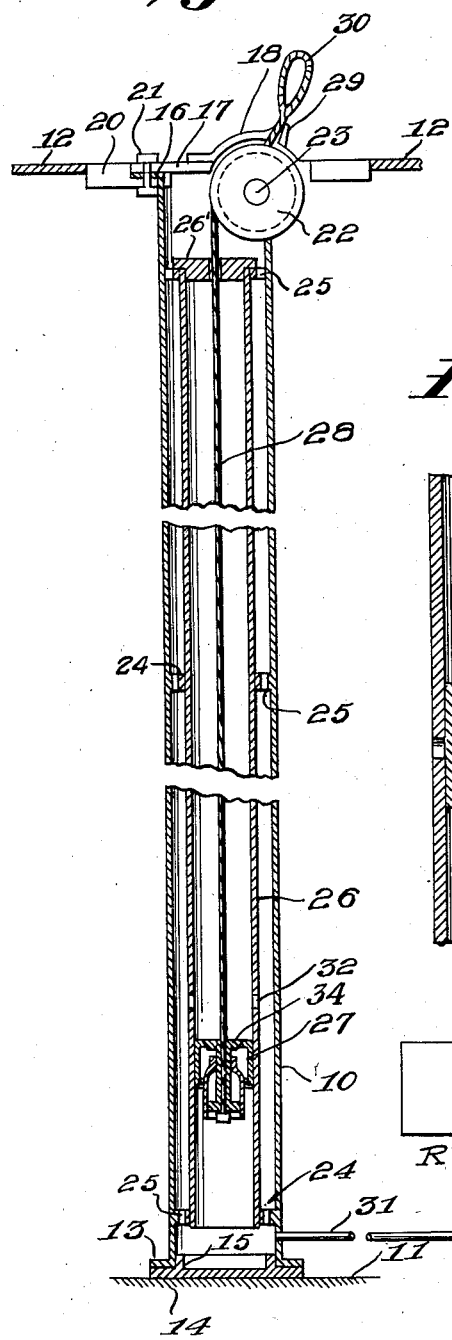
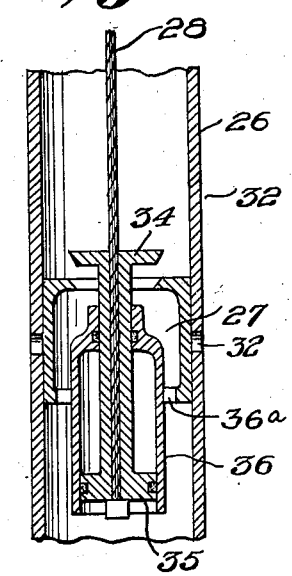
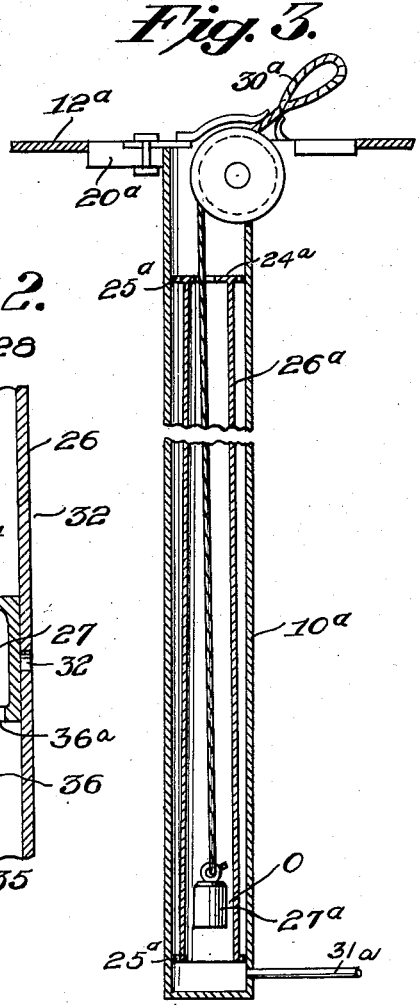
INVENTOR
Robert B. Cotton
BY Herbert M. Birch
ATTORNEY June 10, 1958 — R. B. COTTON — 2,838,259
AIRCRAFT BRIDLE ARRESTER
Filed Oct. 12, 1955 — 2 Sheets-Sheet 2

INVENTOR
Robert B. Cotton.
BY Herbert M. Birch
ATTORNEY

United States Patent Office 2,838,259
Patented June 10, 1958

2,838,259

AIRCRAFT BRIDLE ARRESTER

Robert B. Cotton, Media, Pa., assignor to All American Engineering Company, Wilmington, Del., a corporation of Delaware Application October 12, 1955, Serial No. 539,959

8 Claims. (Cl. 244—110)

The present invention relates to an energy absorber of the fluid type for use in arresting units used for example in connection with launching aircraft from various catapult installations such as may be installed in ship decks and other aircraft runway surfaces.

Another object is to provide an arresting device with barometric fluid supply and gravity leakage return to an energy absorbed tapered tube in combination with a gravity returned absorber engine in said tube, said engine in coaction with the taper of the tube providing a variable orifice adapted to displace the arresting fluid.

Another more special object is to provide an arresting device for aircraft launching bridles released after a catapult launching operation.

Still a further object is to provide a vertically mounted arresting engine having a looped arrest cable extending upward through a deck or runway to a position flush or substantially flush with the deck or landing surface for engagement of the looped end of an arrest cable with means to be arrested.

Another object is to provide a completely below deck mounted energy absorber adapted to be readily accessible for all necessary adjustments from below deck, whereby the actual landing surface is kept clear of personnel during launching operations.

With these and other objects in view, the invention consists in the construction, arrangement and combination of parts hereinafter described and particularly pointed out in the claims, it being understood that I do not intend to limit myself to the details of construction.

In the drawings like parts throughout the several views are given like numerals and are thus identified in the following detailed description:

Figure 1 is a cross section view of one embodiment of the present invention illustrating the energy absorber assembly mounted between a runway or deck and a lower supporting means below deck;

Figure 2 is an enlarged detail view of a valved arresting piston;

Figure 3 is a cross section view of a second embodiment of the invention illustrating a tapered form of arrest tube and a solid piston;

Figure 5:
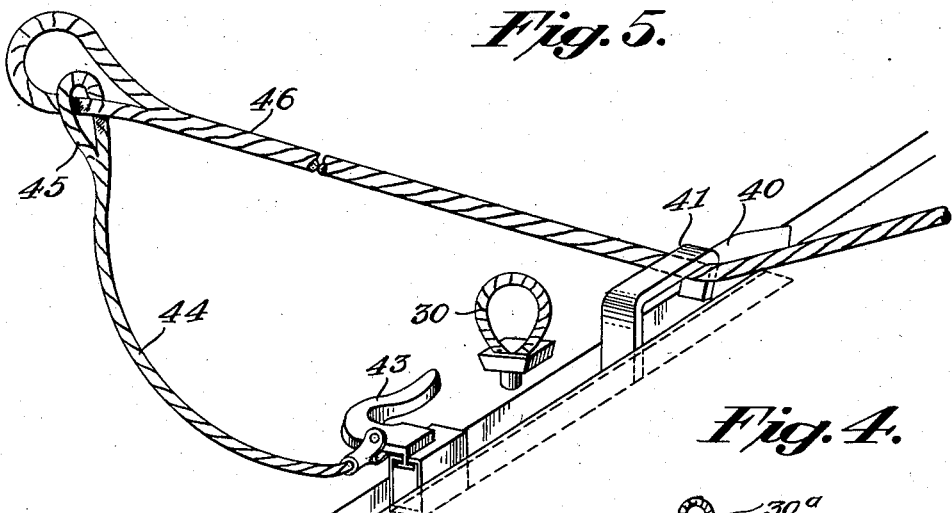
Figure 6:
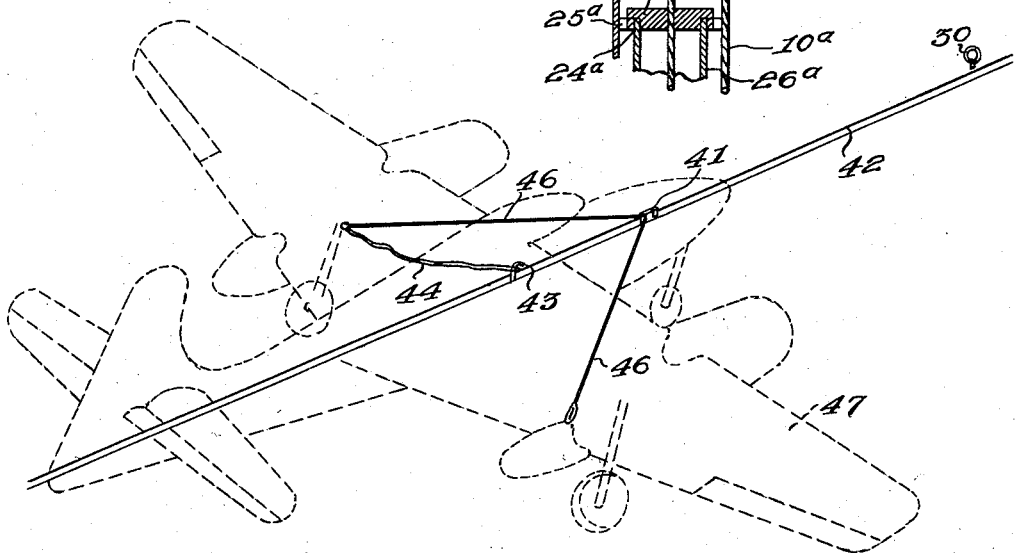

Figure 5 is a partial top perspective view schematically illustrating a landing deck, a catapult track and the energy absorber arrest cable loop in a position laterally adjacent the catapult track prior to a bridle arrest operation; and Figure 6 is a top perspective schematic illustration of an aircraft drawn in phantom being launched from a deck and about to have the pick-up hook engage with the arresting cable loop projected above the deck surface.

Referring to the drawings in detail and first with particular reference to Figures 1 and 2, there is illustrated one form of an energy absorber constructed according to the present invention. Broadly the device comprises an elongated housing tube 10 supported between a base 11, such as a beam or the like anchored below deck or to whatever the supporting structure of the device may be installed upon, and an upper surface 12. The tube 10 may be formed with a flange 13 at its lower end for cooperative support by a base plate 14 formed with a concentrically positioned annular projection 15 frictionally engaged in the lower bore of the tube 10.

The arrest or upper end of the housing tube 10 is flanged over at 16 and capped by a sheave plate 17 carrying a sheave guard 18.

The plate 17 is coupled to the deck surface 12 over the flange 16 to a flanged base plate 20 by bolt means 21 at one sectional portion of the outer circumference of the housing tube 10. The diametrically opposite sectional portion of tube 10 is cut-away to provide for mounting the arrest cable sheave 22, which may be mounted on a shaft 23 journaled in suitable bearings, not shown, in the opposite tube walls or in any suitable bearing bracket therefor, if desired for some installations.

The bore of the housing tube 10 is provided with a plurality of centrally apertured mounting partitions 24. Each mounting partition is formed with openings 25 around the central aperture, which are adapted to permit return passage of fluid from an arrest tube 26 as hereinafter explained.

The arrest tube 26 extends through the partitions and is mounted securely therein by welding or the like. It is the arrest tube 26 when filled with fluid in combination with an arrest engine, such as the piston 27, the arrest cable 28 connected thereto and reeved around the pulley 22, which provide for the energy absorbing action of the device. The cable 28 reeves from pulley or sheave 22 through fair lead 29 and is formed into a loop 30 for engagement with an object to be arrested or decelerated to zero as hereinafter explained.

The lower end or retrieve end of the housing tube 10 is coupled to a fluid intake tube 31 from a supply tank R. This tank will be relatively large and is adapted to supply fluid by gravity through the tube 31 and maintain the arrest tube 26 full of fluid barometrically. The top or arrest end of the tube 26 is closed by a sealing gland 26'. Also the lower portion of the arrest tube 26, in Figures 1 and 2, is formed with time delay openings 32. These openings reduce fluid pressure resistance on the piston 27 as it starts to move through the fluid filled arrest tube 26 from the retrieve end below the openings 32 toward the arrest end above the same. However, when the piston passes these openings, the fluid resistance to the piston movement is greatly increased. This time delay prevents sudden impact deceleration of an object being arrested at the moment of the pick-up hook engagement with the loop 30.

The piston 27 in the embodiment shown in Figures 1 and 2 is formed with a valve 34 adapted to open in response to a pull on the arrest cable 28. This valve 34 is retarded to open position by a retarding means, such as the piston 35 reciprocatable in the cylinder skirt 36. This retarder arrangement is counteracted by the increased pull on arrest cable 28 after the valve body 27 passes the time delay openings 32, whereby the valve 34 opens and fluid in the arrest tube 26 is displaced and squeezed through the valve opening as it is dragged through the fluid toward the arrest end of the tube.

The cylinder skirt 36 is pressurized to approximately 1600 p. s. i. and is secured to the piston 27 by radial means, such as spokes 36a formed from the skirt of the piston 27.

The load on the cable 28 is a function of the hydraulic pressure necessary to open the piston valve 34, that is, a pressure of approximately 1600 pounds per square inch. By providing pressure in the cylinder 36 in excess of load on cable 28, valve 34 is kept closed with the valve piston 35 completely adjacent the lower open end of the cylinder skirt 36.

The provision of a variable orifice through valve 34 results in substantially constant hydraulic pressure in the tube 26 regardless of pressure drop through the body of the piston 27.

When the arrest is accomplished the piston 27 returns by gravity and the pressure in the skirt cylinder 36 will cause the valve 34 to close.

Any leakage beyond the gland 26' is returned by gravity through the apertures 25 of partitions 24 to positions downwardly between the outer diameter of the arrest tube 26 and the bore of the housing tube 10, thus the leakage fluid is never actually lost from the system except by evaporation, if any.

One particular use of the present invention is for bridle arresting in conjunction with catapult launching of aircraft, wherein, for example, a shuttle 40 having a bridle hook 41 is mounted to slide on a catapult track 42, see Fig. 5. The shuttle 40 carries a bridle pick-up hook 43 adapted to slide off the end of the shuttle when engaged by the loop 30 and a leader cable 44, preferably nylon is looped and connected to a bridle 46. As shown in Figure 6, the bridle 46 is connected to an aircraft 47, which bridle releases from the aircraft connections when the shuttle is braked to a stop at the launching end of the track as the aircraft takes off and the pick-up hook 43 then engages with the energy absorber loop 30, so that leader cable 44 and the arrest cable 28 arrests the momentum of the bridle cable 46 after such release. For example, such bridle cables may weigh approximately 300 pounds and when arrested have usually attained a velocity of 160 M. P. H., and for example, the launching frequency may be one operation every 45 seconds for 100 operations.

Figure 4:
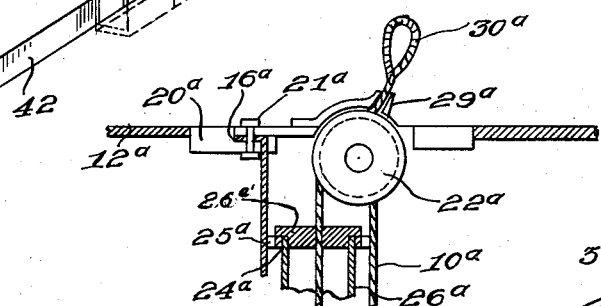
Figure 4 is an enlarged detail of the flush deck mounting for the second embodiment.

Before describing the operation of the form disclosed in Figures 1 and 2, a second embodiment of the device is disclosed in Figures 3 and 4. This form is identical to the first form except for the arrest tube structure and the arrest engine or piston structure, which are each respectively greatly simplified and in many instances may prove more efficient in action and more economical and durable. For example, the arrest tube 26a is tapered from the retrieve end toward the arrest end, and the piston is a solid body 27a relatively smaller than the smallest portion of the tapered inner bore of the arrest tube 26a. Also, the time delay openings 32 of form one are eliminated. Thus, as the piston 27a is dragged from the lower retrieve end position, there is a surrounding annular orifice O, which becomes progressively smaller for greater arrest resistance as the piston travels toward the smaller taper at the arrest end of the arrest tube 26a. The arrest medium or fluid in the tube 26a is displaced and squeezed between the outer diameter and the bore of the tube during each arrest operation and then the weight of the piston 27a returns the same to the retrieve end of the tube 26a after each arrest has been completed by gravity. This form otherwise includes partitions 24a with openings 25a and the same lower and upper mountings and fluid feed line 31a and tank supply, as in Form 1. For example, see Figure 4 for a detail of the arrest end mounting.

*Operation during a bridle arrest*

When a bridle arrest operation is to be accomplished the pick-up hook 43 is attached to the bridle 46 by a relatively short length of nylon rope, such as the leader 44. The hook 43 is slidably releasable from the tail end of the shuttle 40, and when the hook 43 is pulled from the retainer on the shuttle by engaging with the arrest loop 30, the bridle is arrested.

The shuttle 40 as it rides along the track engages the energy absorber loop 30 approximately on foot before the shuttle engages the catapult or shuttle brake, not shown. Then the bridle 46 moves from the shuttle hook 41, the shuttle is stopped and the bridle begins its arrest. Then the bridle 46 completes its arrest, the pick-up hook 43 is manually disengaged from the loop 30 and the piston 27 or 27a retrieves automatically by gravity for the next arrest operation and returns the loop 30 to its proper position.

From the above description it is believed that the present invention is clearly understandable and will enable others skilled in the art to make and use the device. While only two embodiments of the invention are described and illustrated in detail, it is to be expressly understood that other combinations, modifications and arrangements of the parts which will now probably occur to others skilled in the art are to be considered a part hereof. To determine the scope of the present invention, reference should be had to the appended claims.

What I claim is:

1. An elongated energy absorber vertically mounted below a runway having one end flush with the runway, comprising a tube, an elongated housing around the tube, a barometric liquid feed into the said tube adapted to maintain a constant body of liquid therein, liquid displacement means in said tube, and an arresting cable connected to said means, said cable projecting above said runway in the form of a loop for engagement with a mobile object to be arrested.

2. The energy absorber described in claim 1, wherein said tube is formed with a top cap including a stuffing gland for said cable, said housing being spaced around said tube by partitions formed with openings for return by gravity through the space between said housing and said tube of any liquid leakage around the said gland to the exterior of said housing, said tube at the lower end being spaced above the bottom of said housing, whereby said liquid flows by gravity to the bottom portion of said housing below the open end of said tube for reuse in said tube.

3. The energy absorber described in claim 1, wherein said liquid displacement means comprises a piston adapted to be pulled upward in the arrest tube by an object being arrested and whereafter said piston returns by gravity to a pre-arrest position.

4. The energy absorber described in claim 3, wherein the said piston includes an element having a liquid passage and a second element movable relative to said first element for varying the displacement of the liquid in the tube with respect to said passage when an arrest operation is in progress.

5. The energy absorber described in claim 3, wherein the said piston is provided with a liquid transfer opening and a valve therein cooperating with said opening and providing liquid transfer as the piston moves to an arrest position.

6. An energy absorber vertically mounted below a landing surface having an upper end and a lower end, with said upper end being flush with the landing surface, comprising a tube, an elongated housing around the tube, a barometric liquid feed into the said tube adapted to maintain a constant body of liquid therein, liquid displacement means in said tube, and an arresting cable connected to said means, said cable projecting above the said landing surface in the form of a loop for engagement with a mobile object to be arrested, said tube being tapered toward the upper end of the same and wherein said liquid is displaced by squeezing the same progressively between the said cable connected means and the bore of the tube.

7. The energy absorber, described in claim 6, wherein said cable connected means is a solid mass having an outer diameter relatively smaller than the bore of the said tube, to thereby provide an annular orifice between the mass and the tube bore.

8. An energy absorber for an aircraft landing surface, said energy absorber being mounted below the said surface and comprising an elongated tube with one end flush with the said landing surface and with the opposite end below the said surface and being filled with liquid, a piston in the tube having an outer diameter smaller than the bore of the said tube, a fluid inlet conduit opening into the bore of the tube at the lower end thereof, a fluid tank connected to said conduit adapted to be filled with fluid to maintain said tube filled by supply of fluid to the lower end of the tube below said surface, a cable connected to said piston, and a vertical fairlead for said cable extending from the upper end of said tube to a position flush with said surface, and means formed in the cable adapted to be engaged by a moving object to be decelerated by said absorber.

References Cited in the file of this patent

UNITED STATES PATENTS

| | | |
|---|---|---|
| 1,315,320 | Mesurier | Sept. 9, 1919 |
| 1,320,060 | Jenney | Oct. 28, 1919 |
| 1,658,962 | Aikens | Feb. 14, 1928 |
| 1,950,685 | McGee | Mar. 13, 1934 |
| 2,514,406 | Maxson | July 11, 1950 |
| 2,731,219 | Cotton et al. | Jan. 17, 1956 |
| 2,759,688 | Gross | Aug. 21, 1956 |
| 2,777,653 | Cotton et al. | Jan. 15, 1957 |

FOREIGN PATENTS

| | | |
|---|---|---|
| 1,056,323 | France | Oct. 21, 1953 |